(12) United States Patent
Gygi et al.

(10) Patent No.: US 8,868,517 B2
(45) Date of Patent: Oct. 21, 2014

(54) SCATTER GATHER LIST FOR DATA INTEGRITY

(75) Inventors: Carl E. Gygi, Colorado Springs, CO (US); Craig R. Chafin, Colorado Springs, CO (US); Brian J. Varney, Colorado Springs, CO (US); Brian K. Einsweiler, Colorado Springs, CO (US); Luke E. McKay, Rose Hill, KS (US)

(73) Assignee: LSI Corporation, San Jose, CA (US)

( * ) Notice: Subject to any disclaimer, the term of this patent is extended or adjusted under 35 U.S.C. 154(b) by 208 days.

(21) Appl. No.: 13/434,346

(22) Filed: Mar. 29, 2012

(65) Prior Publication Data

US 2013/0262398 A1    Oct. 3, 2013

(51) Int. Cl.
*G06F 17/30* (2006.01)

(52) U.S. Cl.
USPC ........................................................ 707/687

(58) Field of Classification Search
USPC .................... 707/687; 710/305, 105, 104, 20; 726/26; 713/167; 711/100; 718/100
See application file for complete search history.

(56) References Cited

U.S. PATENT DOCUMENTS

| | | | | |
|---|---|---|---|---|
| 6,070,200 A * | 5/2000 | Gates et al. | ...................... | 710/20 |
| 6,202,105 B1 * | 3/2001 | Gates et al. | ...................... | 710/20 |
| 6,609,167 B1 * | 8/2003 | Bastiani et al. | ............... | 710/104 |
| 6,728,722 B1 * | 4/2004 | Shaylor | ................................ | 1/1 |
| 6,865,579 B1 * | 3/2005 | Shaylor | ................................ | 1/1 |
| 6,970,966 B2 * | 11/2005 | Gemelli et al. | ............... | 710/305 |
| 6,978,457 B1 * | 12/2005 | Johl et al. | ...................... | 718/100 |
| 7,130,942 B2 * | 10/2006 | Gemelli et al. | ............... | 710/105 |
| 7,194,569 B1 * | 3/2007 | Shaylor | ......................... | 711/100 |
| 2003/0101307 A1 * | 5/2003 | Gemelli et al. | ............... | 710/305 |
| 2005/0165995 A1 * | 7/2005 | Gemelli et al. | ............... | 710/305 |
| 2007/0130364 A1 | 6/2007 | Joglekar et al. | | |
| 2007/0156729 A1 * | 7/2007 | Shaylor | ......................... | 707/100 |
| 2012/0226904 A1 * | 9/2012 | Orsini et al. | .................. | 713/167 |
| 2012/0311716 A1 * | 12/2012 | Amann et al. | .................. | 726/26 |

* cited by examiner

*Primary Examiner* — Jean M Corrielus
(74) *Attorney, Agent, or Firm* — Suiter Swantz pc llo

(57) ABSTRACT

A system and method for improving message passing between a computer and peripheral devices is disclosed. The system and method for improving message passing between a computer and peripheral devices incorporate data checking on the command/message data and each scatter gather list element. The method in accordance with the present disclosure enables a peripheral device to check the integrity of the message and ownership of the scatter gather list element before the data is processed.

20 Claims, 7 Drawing Sheets

SCATTER GATHER LIST FOR DATA INTEGRITY

TECHNICAL FIELD

The present invention relates to the field of data communication and particularly to a system and method for protecting operations or commands generated by software.

BACKGROUND

Modern computer systems provide an industry standard bus specification to connect peripheral devices that add functionality to the system that is not built in. One example would be a Peripheral Component Interconnect Express (PCIe) interface SAS adapter, which allows SAS protocol drives to be attached to any system that has a PCIe interface for the adapter to be plugged into. These peripheral devices communicate with system software (Operating Systems, device drivers, BIOS, firmware or the like) by transferring information in and out memory attached to the system.

Direct Memory Access (DMA) is a feature of modern computers that allows certain hardware subsystems within the computer to access system memory independently of the central processing unit. DMA can also be used for "memory to memory" copying or moving of data within memory. DMA can offload expensive memory operations, such as large copies or scatter gather operations, from the CPU to a dedicated DMA engine. DMA based add-in devices in modern computer systems move data into and out of system attached memory for use by the operating system or other higher layer software. Usually this information is needed in sparse memory locations, and these devices (like hard drive IO controllers) may use scatter gather lists to move data into and out of sparse locations in memory. The scatter gather list is usually a part of a message or command that describes the operation a peripheral device should perform. The scatter gather list is essentially a list of buffer locations with associated control and size information.

There are many formats for the scatter gather list, including standards base such as IEEE-1212.1 format or vendor specific formats. If the scatter gather list is long it may be divided up into multiple chunks that may be addressed as a linked list of entries. For example, one implementation may use a special scatter gather list element to address the next memory location containing more scatter gather list elements. Alternatively, hierarchical implementations may be utilized, wherein a top level scatter gather list may be used to address a list of memory locations containing scatter gather list elements.

Many methods are available to improve data integrity of the information, including end-to-end data protection (EEDP) methods like T10 data integrity field (DIF). However these solutions do not address many of the issues where the command/message or associated scatter gather list that was generated by the system software might be corrupted during the transfer from system memory to the peripheral card itself. For example, on a write operation to system memory, if a scatter gather list entry corrupted data outside of the application space of the peripheral, the entire transfer could be corrupted. The data for the failing operation may be determined corrupted based on the T10 DIF check, however, data for a totally separate application could also be corrupted, and the system software may not be able to determine what data was compromised. This may indicate that the whole system may be compromised. In another example, on read operations from system memory, corruption may lead to access of system locations that do not exist, or are sensitive to the read operation and may cause other unintended hardware activity. Even though the EEDP check may fail on the data and protect corruption on the failing read operation, system side effects from the errant read may result in system instability or failure.

Another failure mechanism not addressed by current methods is if the size of the scatter gather element is corrupted. This may result in data being written beyond the allocated space in memory for a failing scatter gather list element. This corruption of size for a read from system memory may also result in too much data being read from the host memory system, which in turn could result in data overflow or unrelated data on the peripheral being overwritten. EEDP may protect the failing write or read, but not prevent damage to other system data that could be corrupted outside the application space.

Still another failure may result from corruption of the control information associated with the scatter gather list element. The control information may include direction, address size, entry type (data element or link element to the location of another set of scatter gather list elements), end of list marker or the like. Such a failure may corrupt data outside of the application space of the operation that is being executed.

Therein lies the need to provide systems and methods for protecting operations or commands generated by software.

SUMMARY

Accordingly, an embodiment of the present disclosure is directed to a method for generating a protected message with protected scatter gather list. The method may include generating command data, the command data generated by a computer system for delivery to a peripheral device; calculating a command protection value for the command data; generating a scatter gather list element; calculating a protection value for the scatter gather list element utilizing the command protection value as a seed value; and sending the command data, the command protection value, the scatter gather list element and the protection value for the scatter gather list element to the peripheral device.

A further embodiment of the present disclosure is directed to a method for processing a message with scatter gather list. The method may include receiving the message with scatter gather list from a computer system; obtaining command data from the received message; calculating an expected command protection value for the command data; obtaining a command protection value from the received message; determining whether the expected command protection value matches the command protection value obtained from the received message; and verifying data integrity of the scatter gather list when the expected command protection value matches the command protection value obtained from the received message. Verifying data integrity of the scatter gather list further include obtaining a scatter gather list element from the scatter gather list; calculating an expected protection value for the scatter gather list element; obtaining a protection value for the scatter gather list element from the received message; determining whether the expected protection value for the scatter gather list element matches the protection value for the scatter gather list element obtained from the received message; and performing a data operation specified in the scatter gather list element when the expected protection value for the scatter gather list element matches the protection value for the scatter gather list element obtained from the received message.

An additional embodiment of the present disclosure is directed to a system. The system may include a computer and a peripheral device in communication with the computer via a system bus. The computer may be configured for generating a message for delivery to the peripheral device, wherein the message may be generated according to the steps of: generating command data; calculating a command protection value for the command data; generating at least one scatter gather list element; calculating a protection value for the at least one scatter gather list element; and sending the command data, the command protection value, the at least one scatter gather list element and the protection value for the at least one scatter gather list element to the peripheral device. Furthermore, the peripheral device may be configured for processing the message received from the computer, wherein the message may be processed according to the steps of: obtaining the command data from the received message; verifying data integrity of the command data; obtaining the at least one scatter gather list element; verifying data integrity of the at least one scatter gather list element; and performing a data operation specified in the at least one scatter gather list element when the integrity of the at least one scatter gather list element is verified.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The present disclosure is directed systems and methods for improving message passing between a computer system and peripheral devices that incorporate data checking on the command/message data and each scatter gather list element. The method in accordance with the present disclosure enables a peripheral device to check the integrity of the message and ownership of the scatter gather list element before the data is processed.

Figure 1:
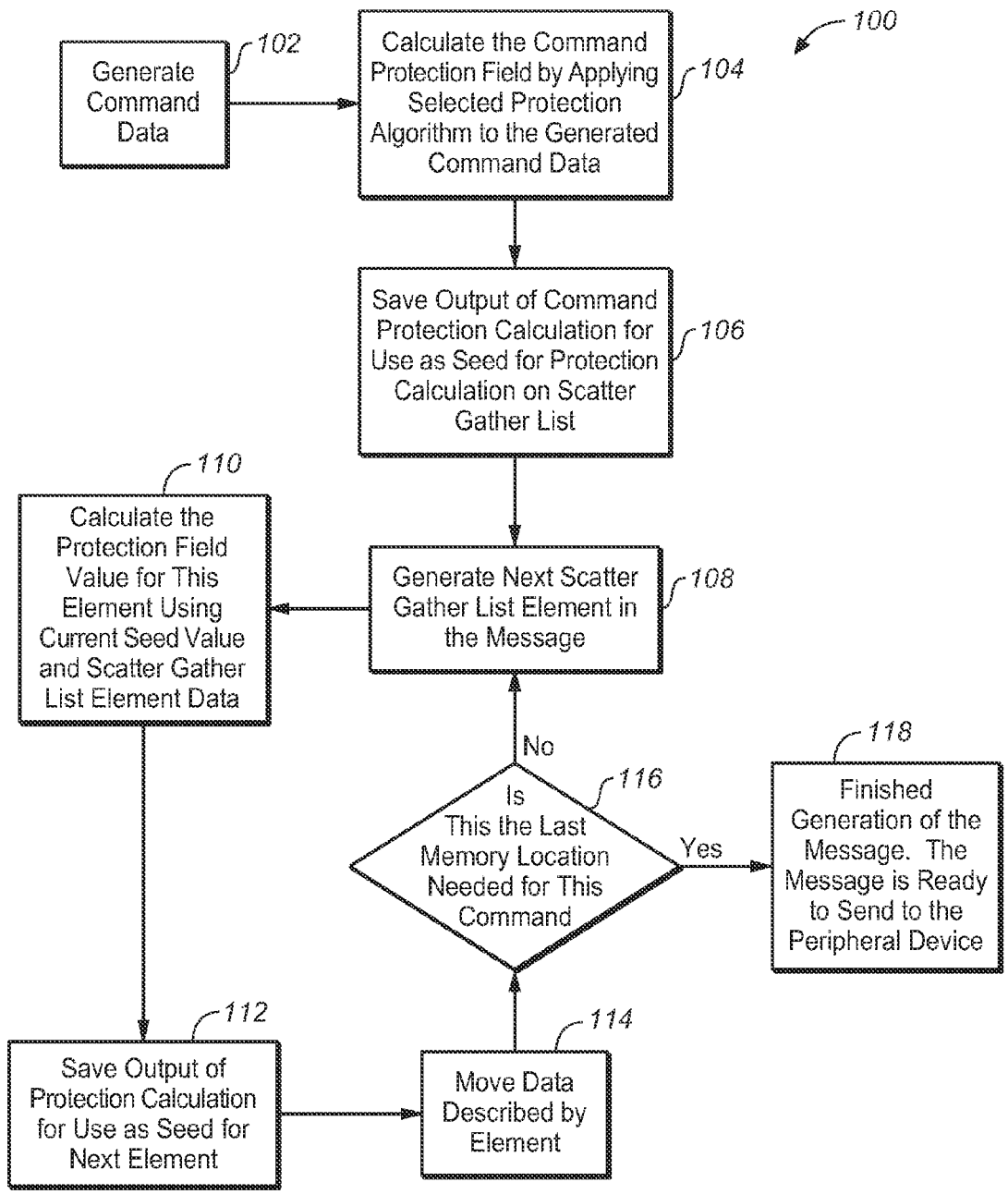
FIG. 1 is a flow diagram illustrating steps performed by a method for generating a protected message with protected scatter gather list.

FIG. 1 shows a flow diagram illustrating steps performed by a method 100 for generating a protected message with protected scatter gather list (SGL) in accordance with the present disclosure. For instance, software, firmware or hardware of a computer system may generate one or more messages in step 102 that need to be communicated to a peripheral device. Such messages may describe one or more operations/commands for the peripheral device to execute. The method 100 may therefore be utilized to add protection fields to the command/operation data as well as each scatter gather list element prior to sending the messages to the peripheral device.

In one embodiment, upon receiving the generated command data, step 104 may calculate the command protection field for the received command data utilizing a protection algorithm. The protection algorithm may be selected from any of the standard available data protection and verification algorithms, such as check-sum, cyclic redundancy check (CRC), hash or the like, as well as any custom-defined or proprietary algorithms. However, regardless of the specific algorithm selected for step 104, the algorithm is required to utilize a seed value in accordance with the present disclosure. In addition, each outstanding operation/command is required to have a unique value within the operation/command data such as a tag or index for the operation. In one embodiment, an application tag may be utilized for the initial seed of the command data protection field in step 104. This application tag is unique per peripheral and application pair. This tag is required to be given to the peripheral device during initialization and is utilized by the peripheral device when checking the protection fields in messages. This allows the peripheral device to identify if the message was intended for it to execute.

Once the command protection field value is calculated in step 104, step 106 may save this protection value for use as seed for protection calculation on the scatter gather list. More specifically, step 108 may generate the first element of the scatter gather list in the message. Step 110 may calculate the protection field value for this element using the saved seed value (saved in step 106) and scatter gather list element data. Step 112 may save the output of the protection calculation of step 110 for use as the seed value for the next element (if any) of the scatter gather list. Step 114 may move the data described by the current element and step 116 may determine whether this is the last memory location needed for the command. If there is an additional memory location pending, the method may repeat from step 108, which in turn may generate the next element of the scatter gather list. On the other hand, if there is no additional memory location pending, step 118 completes the generation of the message, and the message is ready to be sent to the peripheral device.

It is contemplated that the continuous re-seeding of the algorithm with output from the previous data insures that all scatter gather elements for data currently being moved/processed actually belongs to the message for which the data is intended (to the level of certainty possible for the selected protection algorithm). The following pseudo code illustrates an exemplary implementation of the protection algorithm using check sum. However, it is understood that the protection algorithm may be selected from any of the standard available data protection and verification algorithms as well as any custom-defined or proprietary algorithms without departing from the scope and spirit of the present disclosure.

```
// start check sum with application seed
sum = applicationSeed;
i = 0;
while(i < sizeof(CommandData))
{
    // apply algorithm to each part of the
    // command data in the message
    sum = sum + MessageData[i];
}
// write the protection field value into of the message data
```

-continued

```
    MessageData[i] = Sum;
    for (i = 0; i < NumScatterGatherElement; i++)
    {
        MessageData[ScatterStartIndex +
        (i*sizeof(ScatterGatherElement)))] = control[i];
        sum = sum + control;
        MessageData[ScatterStartIndex +
        (i*sizeof(ScatterGatherElement)) + 0x4)] = address[i];
        sum = sum + address;
        MessageData[ScatterStartIndex +
        (i*sizeof(ScatterGatherElement)) + 0x8)] = size[i];
        sum = sum + size;
        MessageData[ScatterStartIndex +
        (i*sizeof(ScatterGatherElement)) + 0xC)] = sum;
    }
```

Figure 2:
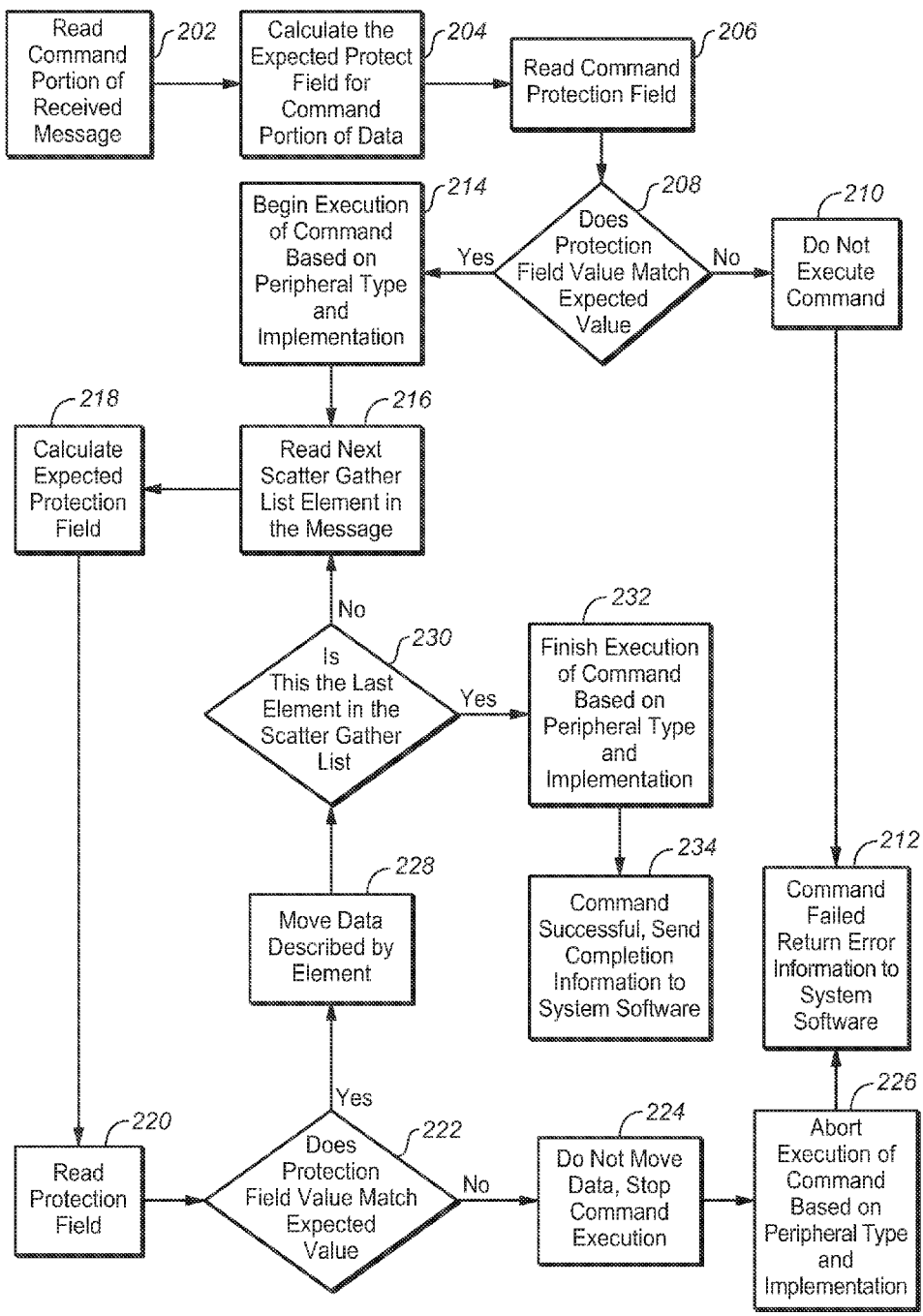
FIG. 2 is a flow diagram illustrating steps performed by a peripheral device for processing the protected message generated in accordance with the method of FIG. 1.

FIG. 2 shows a flow diagram illustrating steps performed by the peripheral device upon receiving the message. In accordance with the present disclosure, the protection data associated with the message should be checked prior to processing the message data. This insures the command/operation data and the scatter gather list elements have not been corrupted during transfer or in the system memory after generation.

In one embodiment, upon receiving the protected message at the peripheral device, step 202 may read the command portion of the received message. Step 204 may calculate the expected protect field for the command portion of the message utilizing the protection algorithm. Step 206 may read the command protection field of the message and step 208 may compare the protection value calculated in step 204 against the protection value obtained in step 206. If the protection value calculated in step 204 does not match the protection value obtained in step 206, step 210 may halt the execution of the command and step 212 may return the error information back to the initiator (the computer system that initiated the command). On the other hand, if the protection value calculated in step 204 matches the protection value obtained in step 206, step 214 may begin execution of command based on peripheral type and implementation.

Subsequently, step 216 may read the first element of the scatter gather list in the message. Step 218 may calculate the expected protection value for this element using the selected protection algorithm. Step 220 may read the protection field value of this element in the message and step 222 may compare the protection value calculated in step 218 against the protection value obtained in step 220. If the protection value calculated in step 218 does not match the protection value obtained in step 220, steps 224 and 226 may stop the data transfer, halt and abort the execution of the command based on peripheral type and implementation. Step 212 may then return the error information back to the initiator.

On the other hand, if the protection value calculated in step 218 matches the protection value obtained in step 220, step 228 may move/transfer the data (i.e., perform the data operation) described by the scatter gather list element. Step 230 may determine whether there are any additional elements in the scatter gather list. The process may repeat from step 216 again until all elements in the scatter gather list are processed successfully (it is understood that an unsuccessful process would result in steps 224, 226 and 212). Subsequently, step 232 may carry out the execution of the command based on peripheral type and implementation, and step 234 may send completion information to the initiator upon a successful execution.

It is understood that the steps described above are utilized for protecting operations or commands generated by software. The execution of the specific command carried out by the peripheral device may vary based on the implementation of the peripheral device without departing from the spirit and scope of the present disclosure.

Figure 3:
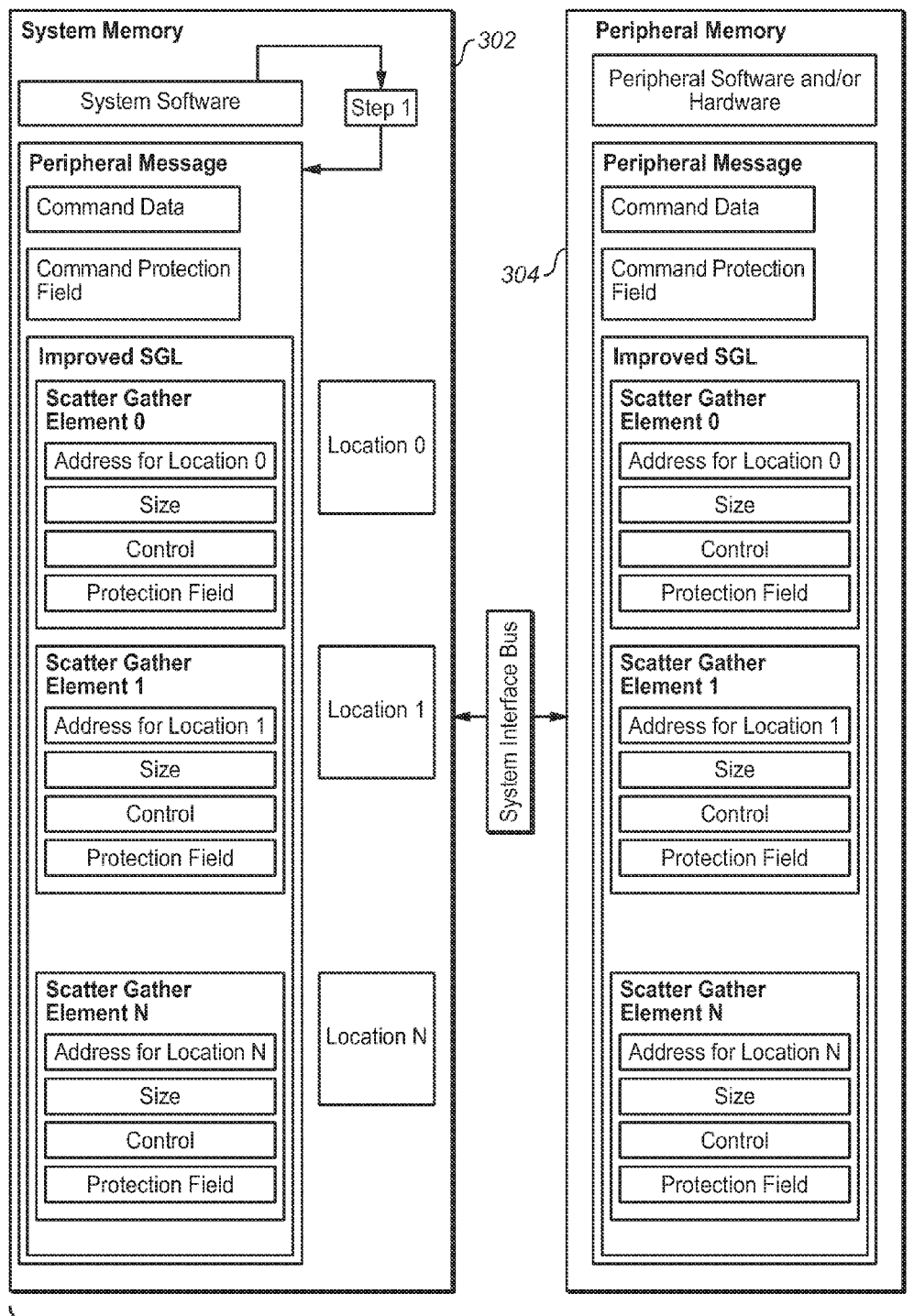
FIGS. 3 through 7 are block diagrams illustrating a system that utilizes the protection method in accordance with the present disclosure.
Figure 4:
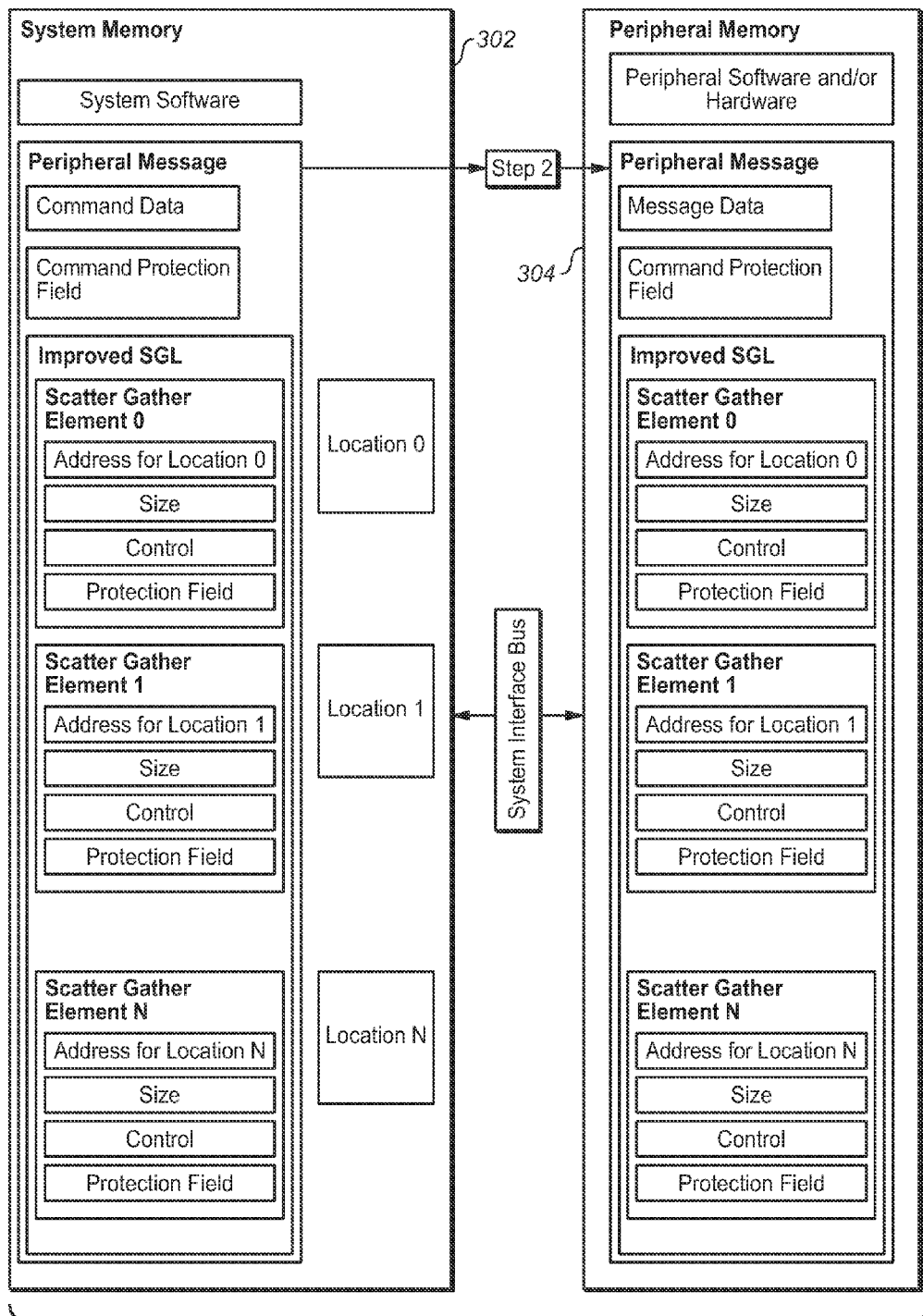

Referring generally to FIGS. 3 through 7, block diagrams illustrating a system that utilizes the protection method in accordance with the present disclosure are shown. As shown in FIG. 3, a peripheral device 304 is attached to a computer system 302 through a system bus. In accordance with the present disclosure, for the system software (e.g., software installed on the computer system 302) to protect its operations or commands to be sent to the peripheral device 304, the system software may first generate a protected message using a protection algorithm as described in FIG. 1 above. Subsequently, as shown in FIG. 4, the system software may notify the peripheral device that a message is ready to be executed.

Figure 5:
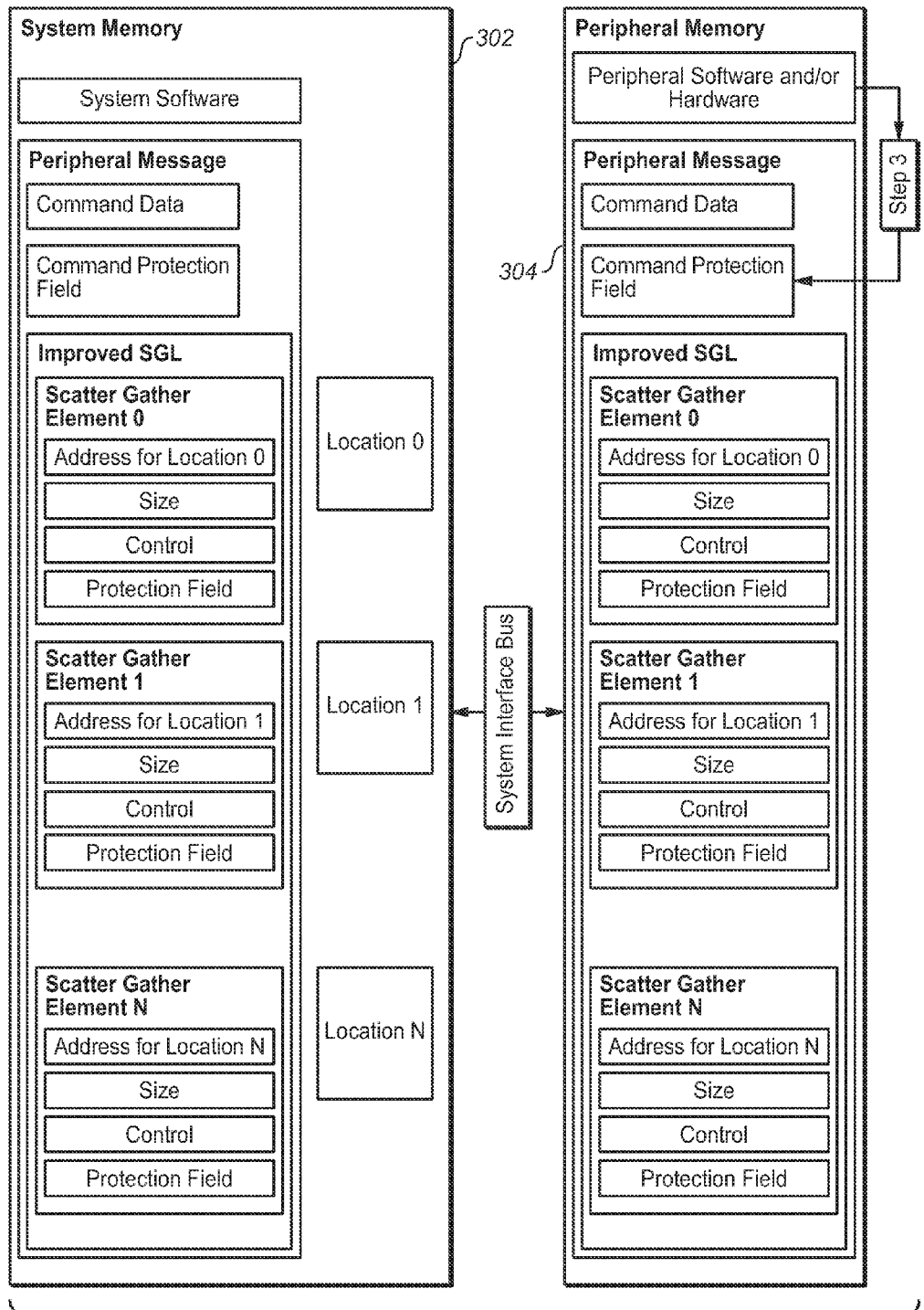
Figure 6:
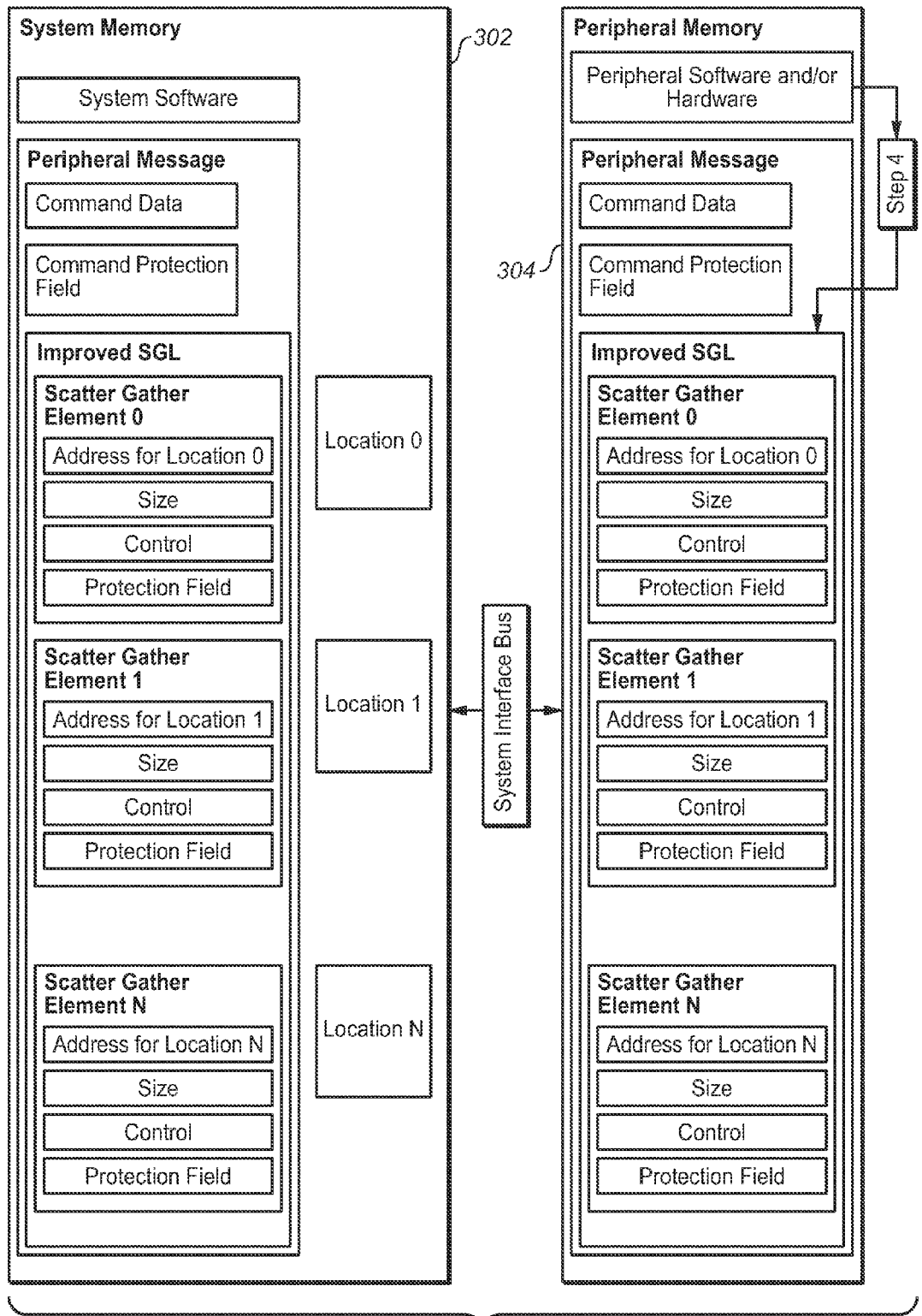
Figure 7:
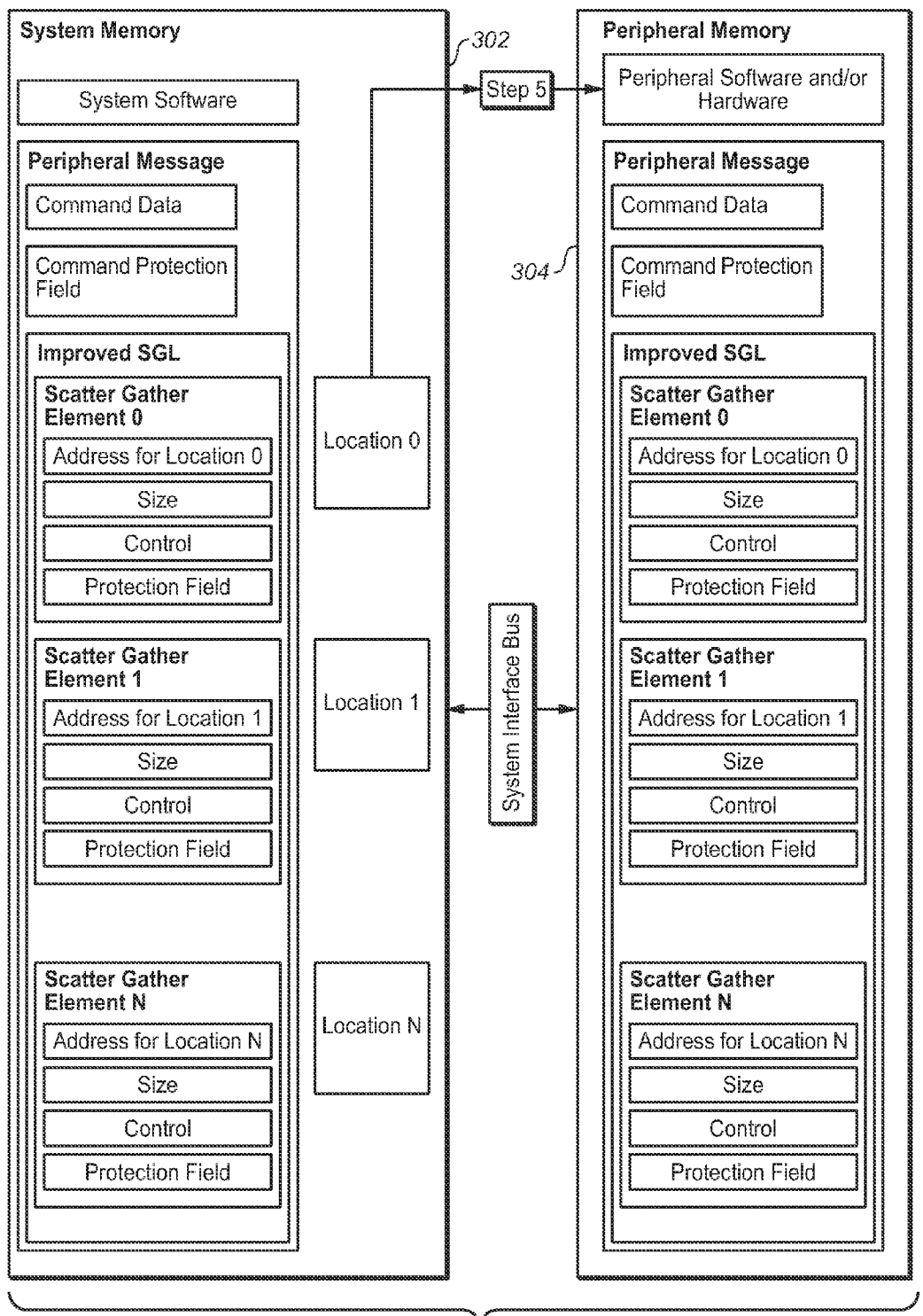

The hardware and/or software on the peripheral device may then copy the message from the system memory into its local memory so that it can begin processing. For instance, the hardware and/or software on the peripheral device may read the command information and apply the protection algorithm to the data as indicated in FIG. 5. If the calculated protection value matches the command/operation protection field in the message then execution of the operation may begin. The hardware and/or software on the peripheral may then start reading the scatter gather element as indicated in FIG. 6 and use the previous protection field value as the seed to the protection algorithm to calculate the expected protection field value for each element. If the value in the protection field matches the calculated expected value, then the hardware and/or software on the peripheral may execute the command/operation for the data described by the scatter gather element, as indicated in FIG. 7. The detailed steps performed by the hardware and/or software on the peripheral device may implement the method previously described in FIG. 2.

The method and system in accordance with the present disclosure utilizes protection values to maintain system integrity. Instead of providing end-to-end data protection, the present disclosure provides a way for a software driver to protect a string of operations or commands generated by software. Such operations or commands may be sent to a peripheral device attached to the CPU and memory through a system bus. The peripheral device applies the operations to requested data both in system memory and data remotely stored on other storage media. Every outstanding sequence of instruction/commands is uniquely protected by the driver so no instruction/command can be confused with other outstanding strings of operations. This protection allows the peripheral device to determine whether each instruction is a part of the correct sequence intended by the driver before executing the operation/command on the requested data, so that the peripheral device does not incorrectly execute instructions on wrong data and or put the results in the wrong location compromising system memory and/or the integrity of the system.

In accordance with the present disclosure, a peripheral device is able to determine whether the command/operation data differs from what was intended by the system software, whether the control information of the scatter gather element has been corrupted from what was generated by the system software, whether the size information of the scatter gather element has been corrupted from what was generated by the system software, and whether the address of the scatter gather element has been corrupted from what was generated by the system software all before the execution of the command, therefore preventing corruption of data inside or outside of the application space of the peripheral device. This prevents corruption of system data and message data going to the peripheral device for processing and thus increases data integrity of the overall system. Furthermore, the peripheral device is able to determine whether the elements of the scatter gather list the peripheral device is executing belong to the same message and command intended by the system software. This also prevents corruption of system data and message data going to the peripheral device for processing and increases data integrity of the system.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for generating a protected message with protected scatter gather list, the method comprising:
generating command data, the command data generated by a computer system for delivery to a peripheral device;
calculating a command protection value for the command data;
generating a scatter gather list element;
calculating a protection value for the scatter gather list element utilizing the command protection value for the command data as a seed value; and
sending the command data, the command protection value, the scatter gather list element and the protection value for the scatter gather list element to the peripheral device, wherein said calculating the command protection value and said calculating the protection value for the scatter gather list element match with at least one protection algorithm utilized by the peripheral device for calculating an expected command protection value and an expected protection value for the scatter gather list element, allowing the peripheral device to validate the command data and the scatter gather list element based on the command protection value and the protection value for the scatter gather list element and to perform a data operation specified in the scatter gather list element only when the command data and the scatter gather list element are validated.

2. The method of claim 1, further comprising:
determining whether to generate an additional scatter gather list element;
generating the additional scatter gather list element;
calculating a protection value for the additional scatter gather list element utilizing the protection value for the first-mentioned scatter gather list element as the seed value; and
sending the command data, the command protection value, the scatter gather list elements and the protection values for the scatter gather list elements to the peripheral device.

3. The method of claim 1, wherein the command data, the command protection value, the scatter gather list element and the protection value for the scatter gather list element are sent to the peripheral device via a system bus.

4. The method of claim 1, wherein an application tag is utilized as an initial seed for calculating the command protection value for the command data.

5. A method for processing a message with scatter gather list, the method comprising:
receiving the message with scatter gather list from a computer system;
obtaining command data from the received message;
calculating an expected command protection value for the command data;
obtaining a command protection value from the received message;
determining whether the expected command protection value matches the command protection value obtained from the received message;
verifying data integrity of the scatter gather list when the expected command protection value matches the command protection value obtained from the received message, further comprising:
obtaining a scatter gather list element from the scatter gather list;
calculating an expected protection value for the scatter gather list element;
obtaining a protection value for the scatter gather list element from the received message;
determining whether the expected protection value for the scatter gather list element matches the protection value for the scatter gather list element obtained from the received message; and
performing a data operation specified in the scatter gather list element when the expected protection value for the scatter gather list element matches the protection value for the scatter gather list element obtained from the received message.

6. The method of claim 5, wherein an application tag is utilized as an initial seed for calculating the expected command protection value for the command data.

7. The method of claim 5, wherein the command protection value for the command data is utilized as a seed for calculating the expected protection value for the scatter gather list element.

8. The method of claim 5, further comprising:
executing the command when the scatter gather list is verified successfully.

9. The method of claim 5, further comprising:
halting the execution when the expected command protection value differs from the command protection value obtained from the received message.

10. The method of claim 5, further comprising:
halting the execution and data operation when the expected protection value for the scatter gather list element differs from the protection value for the scatter gather list element obtained from the received message.

11. The method of claim 5, further comprising:
obtaining an additional scatter gather list element from the scatter gather list;
calculating an expected protection value for the additional scatter gather list element;
obtaining a protection value for the additional scatter gather list element from the received message; and
determining whether the expected protection value for the additional scatter gather list element matches the protection value for the additional scatter gather list element obtained from the received message; and
performing an additional data operation specified in the additional scatter gather list element when the expected protection value for the additional scatter gather list element matches the protection value for the additional scatter gather list element obtained from the received message.

12. The method of claim 11, further comprising:
halting the execution and data operation when the expected protection value for the additional scatter gather list element differs from the protection value for the additional scatter gather list element obtained from the received message.

13. The method of claim 11, wherein the protection value for the first-mentioned scatter gather list element is utilized as the seed for calculating the expected protection value for the additional scatter gather list element.

14. A system, comprising:
a computer;
a peripheral device in communication with the computer via a system bus;
wherein the computer is configured for generating a message for delivery to the peripheral device, the message being generated according to the steps of:
generating command data;
calculating a command protection value for the command data;
generating at least one scatter gather list element;
calculating a protection value for the at least one scatter gather list element; and
sending the command data, the command protection value, the at least one scatter gather list element and the protection value for the at least one scatter gather list element to the peripheral device; and
wherein the peripheral device is configured for processing the message received from the computer, the message being processed according to the steps of:
obtaining the command data from the received message;
verifying data integrity of the command data;
obtaining the at least one scatter gather list element;
verifying data integrity of the at least one scatter gather list element; and
performing a data operation specified in the at least one scatter gather list element when the integrity of the at least one scatter gather list element is verified.

15. The system of claim 14, wherein an application tag is utilized as an initial seed for calculating the command protection value for the command data.

16. The system of claim 14, wherein the protection value for one of the at least one scatter gather list element is utilized as a seed for calculating the protection value for a subsequent one of the at least one scatter gather list element.

17. The system of claim 14, wherein verifying data integrity of the command data comprises:
calculating an expected command protection value for the command data;
obtaining a command protection value from the received message; and
determining whether the expected command protection value matches the command protection value obtained from the received message.

18. The system of claim 17, wherein the peripheral device is further configured for halting the execution when the expected command protection value differs from the command protection value obtained from the received message.

19. The system of claim 14, wherein verifying data integrity of the at least one scatter gather list element comprises:
calculating an expected protection value for the at least one scatter gather list element;
obtaining a protection value for the at least one scatter gather list element from the received message;
determining whether the expected protection value for the at least one scatter gather list element matches the protection value for the scatter gather list element obtained from the received message.

20. The system of claim 19, wherein the peripheral device is further configured for halting the execution and data operation when the expected protection value for the at least one scatter gather list element differs from the protection value for the at least one scatter gather list element obtained from the received message.

* * * * *